United States Patent
Bergman

(10) Patent No.: US 8,709,574 B2
(45) Date of Patent: Apr. 29, 2014

(54) FROTHABLE AQUEOUS COMPOSITION FOR USE IN A CARPET BACKING COMPOSITION

(75) Inventor: Roger W. Bergman, Midland, MI (US)

(73) Assignee: Dow Global Technologies, LLC, Midland, MI (US)

( * ) Notice: Subject to any disclaimer, the term of this patent is extended or adjusted under 35 U.S.C. 154(b) by 664 days.

(21) Appl. No.: 12/736,728

(22) PCT Filed: May 5, 2009

(86) PCT No.: PCT/US2009/002770
§ 371 (c)(1),
(2), (4) Date: Jan. 10, 2011

(87) PCT Pub. No.: WO2009/137034
PCT Pub. Date: Nov. 12, 2009

(65) Prior Publication Data

US 2011/0097535 A1    Apr. 28, 2011

Related U.S. Application Data

(60) Provisional application No. 61/126,700, filed on May 6, 2008.

(51) Int. Cl.
*B32B 33/00* (2006.01)
*B32B 37/12* (2006.01)

(52) U.S. Cl.
USPC .................................. 428/97; 428/95; 156/72

(58) Field of Classification Search
USPC ............... 428/97, 95; 156/72; 427/389.9, 394
See application file for complete search history.

(56) References Cited

U.S. PATENT DOCUMENTS

| 5,147,899 | A | 9/1992 | Sato et al. | |
|---|---|---|---|---|
| 7,732,545 | B2 * | 6/2010 | Sagawa et al. | 526/245 |
| 7,868,094 | B2 | 1/2011 | Han et al. | |
| 2002/0028876 | A1 * | 3/2002 | Jenkines et al. | 524/591 |
| 2006/0052516 | A1 * | 3/2006 | Sagawa et al. | 524/556 |
| 2007/0117927 | A1 | 5/2007 | Han et al. | |
| 2009/0286931 | A1 * | 11/2009 | Sagawa et al. | 524/752 |
| 2010/0098901 | A1 * | 4/2010 | Cowart et al. | 428/95 |
| 2010/0204352 | A1 * | 8/2010 | Bergman et al. | 521/89 |
| 2011/0028580 | A1 * | 2/2011 | Bergman et al. | 521/149 |

FOREIGN PATENT DOCUMENTS

| EP | 0356822 | 3/1990 |
|---|---|---|
| EP | 1788057 | 5/2007 |
| WO | 01/34673 | 5/2001 |
| WO | WO 03027157 A1 * | 4/2003 |

OTHER PUBLICATIONS

International Search Report & Written Opinion From Related PCT Application PCT/US2009/002770, dated Mar. 8, 2009, 15 pages.
International Preliminary Report on Patentability From Related PCT Application PCT/US2009/002770, dated Apr. 8, 2010, 8 pages.

* cited by examiner

*Primary Examiner* — Cheryl Juska
(74) *Attorney, Agent, or Firm* — Brooks, Cameron & Huebsch, PLLC

(57) ABSTRACT

A carpet backing composition that includes a frothable aqueous composition and a froth aid. The frothable aqueous composition includes a polymeric binder, and the froth aid includes a polypropylene glycol, a polypropylene glycol ether, or a combination thereof. The froth aid has a weight average molecular weight of 130 to 2000. The carpet backing composition can be used to prepare a carpet product.

10 Claims, No Drawings

FROTHABLE AQUEOUS COMPOSITION FOR USE IN A CARPET BACKING COMPOSITION

This application is a National Stage application under 35 U.S.C. 371 of PCT/US2009/002770, filed on May 5, 2009 and published as WO 2009/137034 on Nov. 12, 2009, which claims priority in part from U.S. Provisional Application Ser. No. 61/126,700 filed May 6, 2008, the entire content of which is incorporated herein by reference.

FIELD OF THE DISCLOSURE

The present disclosure generally relates to a frothable aqueous composition, and particularly to a carpet backing composition that includes the frothable aqueous composition.

BACKGROUND

Most conventional carpets comprise a primary backing with yarn tufts in the form of cut or uncut loops extending upwardly from the backing to form a pile surface. In the case of tufted carpets, the yarn is inserted into a primary backing by tufting needles and then a pre-coat or binder is applied thereto. In the case of non-tufted or bonded pile carpets, the fibers are embedded and held in place by a binder composition.

In both cases, the carpet construction usually also includes a secondary backing bonded to the primary backing. The secondary backing can provide extra padding to the carpet, absorb noise, add dimensional stability and often function as a heat insulator. The secondary backing, typically either a foam sheet or a woven fabric, is laminated to the primary backing by a binder composition applied to the tuft-lock coated primary backing or applied directly to the secondary backing. Similar techniques are used in the preparation of broadloom carpet as well as carpet tiles.

The physical properties of the binder are important to successful utilization as a carpet backing coating. In this regard, there are a number of requirements that must be met by such a coating. It must be capable of being applied to the carpet and dried using the processes and equipment conventionally employed in the carpet industry. It must provide excellent adhesion to the pile fibers to secure them firmly to the backing, both in tufted and non-tufted constructions. The coating must also have low smoke density values and high flame retardant properties and must accept a high loading of traditional fillers such as calcium carbonate, aluminum trihydrate, barite and feldspar. Furthermore, the coating must maintain sufficient softness and flexibility, even with high filler loading or at low temperature, to enable the carpet, if prepared in broadloom form, to be easily rolled and unrolled during installation. The softness and flexibility properties will vary depending on the style of carpet but, in all cases, it is important that the carpet will lie flat and not exhibit a tendency to curl or dome.

In the application of the coating composition to a carpet substrate, it is often advantageous to froth or foam the coating composition with a gas, typically air, before application. The gas is incorporated into the coating composition by mechanical action (frothing) to form a froth. A coating composition froths well if the desired compound froth density or air content can be obtained quickly and reproducibly. In preparing the frothed coating composition, the typical process involves mixing all the components and then incorporating the gas into the mixture using mixing equipment. Surfactants can be added to the coating composition to modify the rate and extent to which air is entrapped. Examples of such surfactants include sodium lauryl sulfate or ammonium lauryl sulfate.

Frothing of the coating composition aids in coat weight control. It is important that the froth collapse after application of the coating composition, but before drying of the coating is complete. This collapse is necessary to obtain good binding to the secondary backing. If the froth does not collapse sufficiently a froth structure remains that can have much poorer secondary backing adhesion.

It would be desirable to have a coating composition for use in the manufacture of carpet and carpet tile, such that the coating composition would froth or foam well, be sufficiently stable to obtain good coating weight control, and collapse well at some point after coating or early in the drying process (before voids are set in place by the dried compound).

SUMMARY

This disclosure pertains to a frothable aqueous composition that includes a polymeric binder and a froth aid. For the various embodiments, the froth aid includes a polypropylene glycol, a polypropylene glycol ether, or a combination thereof. For the various embodiments, the froth aid has a weight average molecular weight of 130 to 2000. In addition, the polypropylene glycol ether has a formula R—O—[$CH_2CH(CH_3)$]$_n$—OH, where R may be hydrogen or an alkyl group containing 1 to 22 carbon atoms ($C_1$-$C_{22}$) and n is a number from 2 to 35. In one embodiment, a carpet backing composition can be formed using the frothable aqueous composition. When used as a carpet backing composition the frothable aqueous composition can further include at least an inorganic filler. Another aspect of the disclosure includes carpet products made using the carpet backing composition of the present disclosure. In addition, a method for producing a carpet product that makes use of the carpet backing composition, and a method of coating a carpet with the carpet backing composition is also disclosed herein. Embodiments of the present disclosure further include a method for producing a froth with the carpet backing composition as disclosed herein. For the various embodiments, the carpet backing compositions exhibit increased frothing with decreased froth stability due to the presence of the froth aid, which allows the froth to gradually collapse after application of the coating composition, but before drying of the coating is complete.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DEFINITIONS

For the purposes of the present disclosure, the term "dry" means in the substantial absence of water, the term "dry basis" refers to the weight of a dry material, and "dry weight parts" refers to the weight parts of a dry material.

For the purposes of the present disclosure, the term "copolymer" means a polymer derived from more than one species of monomer.

As used herein, "Tg" is an abbreviation for glass transition temperature. For the purposes of the present disclosure, the term "low Tg monomer" means a monomer, which when homopolymerized, gives a homopolymer having a Tg of less than 10° C., and the term "high Tg monomer" means a monomer, which when homopolymerized, gives a homopolymer having a Tg of at least 10° C.

For the purposes of the present disclosure, the term "(meth)" indicates that the methyl substituted compound is included in the class of compounds modified by that term. For example, the term (meth)acrylic acid represents acrylic acid and methacrylic acid.

While in the carpet industry the term "foam" refers to a filler-free material and the term "froth" usually refers to a filled material, the terms "foam" and "froth" are used interchangeably herein.

For the purposes of the present disclosure "frothability", which may be used interchangeably with "foamability", refers to a froth density over an interval of time such that greater frothability results with lower froth densities over shorter periods of time.

As used herein, "stability," in reference to froth, refers to the collapse of a froth over time. For example, the percent (%) stability of the froth can be measured at 30 minutes by dividing the froth volume at 30 minutes by the starting froth volume and multiplying by 100. A lower percent (%) volume of froth remaining means less froth stability.

As used herein, "pphm" is an abbreviation for parts by weight per 100 parts by weight of the monomers.

As used herein, "MW" is an abbreviation for weight average molecular weight.

As used herein, "° C." is an abbreviation for degrees Celsius.

As used herein, "g" is an abbreviation for gram(s).

As used herein, "cP" is an abbreviation for centipoise.

As used herein, "cc" is an abbreviation for cubic centimeter.

As used herein, "alkyl" refers to a hydrocarbon group having the general formula $C_nH_{2n+1}$, where n is the number of carbon atoms.

The term "and/or" means one, one or more, or all of the listed elements.

As used herein, "room temperature" refers to an ambient temperature of 20° C. to 25° C.

Unless otherwise indicated, all numbers expressing quantities of components, weight parts, temperatures, percentages, and so forth used in the specification and claims can be understood as being modified by the term "about."

As used herein, "a" "an" "the" "at least one" and "one or more" are used interchangeably. The terms "includes" and "comprises" and variations thereof do not have a limiting meaning where these terms appear in the description and claims. Thus, for example, a carpet backing composition that comprises "a" polymeric binder can be interpreted to mean that the polymeric binder includes "one or more" polymeric binders.

Also herein, the recitations of numerical ranges by endpoints include all numbers subsumed with that range (e.g. 1 to 5 includes 1, 1.5, 2, 2.75, 3, 3.8, 4, 5, etc.).

DETAILED DESCRIPTION

The present disclosure includes a frothable aqueous composition having at least a polymeric binder and a froth aid that provides for increased frothing with decreased froth stability. For the various embodiments discussed herein, the froth aid includes a polypropylene glycol, a polypropylene glycol ether or a combination thereof. For the various embodiments, the selection of the amount, the weight average molecular weight, and/or the type of the polypropylene glycol and/or the polypropylene glycol ether for the froth aid can allow for increasing froth generation while reducing froth stability.

As discussed herein, the frothable aqueous composition allows for a froth having a froth density of a desired level to be quickly and reproducibly obtained, for the froth to be sufficiently stable for a predetermined time sufficient for it to be applied at a desirable coating weight to a substrate (e.g., a carpet griege), and then for the froth to collapse after coating and/or early in the drying process so that voids in the froth are not set in the dried compound. In addition, the froth aid of the present disclosure can be used in applications where there is a need for an aqueous composition to froth rapidly and then to collapse quickly after the froth is applied to a substrate. By way of example, such an application can include the use of the frothable aqueous composition as a carpet backing composition, which includes the polymeric binder, the froth aid and an inorganic filler, among others additives.

For the various embodiments, the polymeric binder can be employed in a binding amount for use in the manufacture of the desired article. So, for example, when used with carpet products the polymeric binder of the carpet backing composition is present in a binding amount. For example, when used with carpet products the binding amount of the polymeric binder can function to hold fiber tufts in place, adhere the secondary backing to the fiber construction, and/or to provide dimensional stability to the final carpet structure.

The frothable aqueous composition can include a variety of one or more polymeric binders. For example, polymeric binders used in the preparation of carpet products are well known and are commercially available. In a specific embodiment, the polymeric binder employed in the frothable aqueous composition of the present disclosure can include a synthetic latex. A synthetic latex, as is well known, is an aqueous dispersion of polymer particles prepared by emulsion polymerization of one or more monomers. Examples of synthetic latexes can include dispersions of a polyolefin and/or a polyurethane, among others.

The polymer of the polymeric binder can be a homopolymer, but preferably is a copolymer. The copolymer can be prepared from a combination of more than one species of monomers that give the desired binder properties for the intended application. For example, the Tg of the polymeric binder can vary based upon the intended application. Advantageously, the polymeric binder has a Tg of from −20° C. to 30° C., preferably from −15° C. to 20° C., and more preferably from −10° C. to 10° C. For the various embodiments, the polymeric binder can be prepared from a combination of one or more low Tg monomers, one or more high Tg monomers, and a functional comonomer.

Examples of low Tg monomers include monomers having a Tg of less than 10° C. that are dienes, $C_1$-$C_{10}$ alkyl esters of acrylic acid, $C_2$-$C_{10}$ alkyl esters of alpha, beta-ethylenically unsaturated $C_4$-$C_6$ monocarboxylic acids, $C_4$-$C_{10}$ dialkyl esters of alpha, beta-ethylenically unsaturated $C_4$-$C_8$ dicarboxylic acids, ethylene, and vinyl esters of carboxylic acids, including, without limitation, vinyl isobutyrate, vinyl-2-ethyl-hexanoate, vinyl propionate, vinyl isooctanoate and vinyl versatate. Preferably, the low Tg monomer is selected from the group consisting of dienes, $C_1$-$C_{10}$ alkyl esters of (meth)acrylic acid i.e. alkyl (meth)acrylates, and $C_4$-$C_8$ dialkyl esters of maleic, itaconic and fumaric acids. Particularly preferred low Tg monomers include butadiene, isoprene, ethyl acrylate, butyl acrylate, 2-ethyl hexyl acrylate, decyl acrylate, dibutyl maleate and dioctyl maleate, with butadiene being a preferred monomer.

Examples of high Tg monomers include styrene, alpha-methyl styrene, vinylidene chloride, methyl methacrylate, dimethyl maleate, t-butyl methacrylate, t-butyl isobornyl acrylate, phenyl methacrylate, acrylonitrile, vinyl acetate, and vinyl esters of carboxylic acids having a Tg of 10° C. or greater. Examples of such vinyl esters include vinyl pivalate, vinyl neodecanoate, vinyl neononanoate, and mixtures of branched vinyl esters such as the commercially available VEOVA 11 (Resolution Performance Products) and EXXAR NEO-12 (ExxonMobil Chemical). Styrene is a preferred high Tg monomer. In one embodiment, the polymeric binder is a synthetic latex of copolymerized styrene and butadiene (e.g., 1,3-butadiene) monomers.

It may also be desirable to incorporate, in the polymeric binder, one or more functional comonomers. Suitable copolymerizable functional comonomers include, for example: acrylic acid; methacrylic acid; itaconic acid; fumaric acid; the half esters of maleic acid, such as monoethyl, monobutyl or monooctyl maleate; acrylamide; tertiary octylacrylamide; N-methylol (meth)acrylamide; N-vinylpyrrolidinone; diallyl adipate; triallyl cyanurate; butanediol diacrylate; allyl methacrylate; etc.; as well as $C_2$-$C_3$ hydroxyalkyl esters such as hydroxyethyl acrylate, hydroxy propyl acrylate and corresponding methacrylates. The functional comonomer generally is used at levels of less than 5 pphm, preferably less than 3 pphm, depending upon the nature of the specific comonomer.

In addition, certain copolymerizable monomers that assist in the stability of the polymeric binder, e.g., vinyl sulfonic acid, sodium vinyl sulfonate, sodium styrene sulfonate, sodium allyl ether sulfate, sodium 2-acrylamide-2-methyl-propane sulfonate (AMPS), 2-sulfoethyl methacrylate, and 2-sulfopropyl methacrylate, can be employed as emulsion stabilizers. These optional monomers, if employed, are advantageously added in amounts from 0.1 pphm to 2 pphm.

Methods for preparing the polymeric binder are known in the art and these procedures can be used. For example, the polymeric binder can be produced through an emulsion polymerization process in which the reactants are in an emulsified form.

Suitable free radical polymerization initiators are the initiators capable of promoting emulsion polymerization and include water-soluble oxidizing agents, such as, organic peroxides (e.g., t-butyl hydroperoxide, cumene hydroperoxide, etc.), inorganic oxidizing agents (e.g., hydrogen peroxide, potassium persulfate, sodium persulfate, ammonium persulfate, etc.) and those initiators that are activated in the water phase by a water-soluble reducing agent. Such initiators are employed in an amount sufficient to cause polymerization. Generally, a sufficient amount is from 0.1 pphm to 5 pphm. Alternatively, redox initiators may be employed, especially when polymerization is carried out at lower temperatures. For example, reducing agents may be used in addition to the persulfate and peroxide initiators mentioned above. Typical reducing agents include, but are not limited to: alkali metal salts of hydrosulfites, sulfoxylates, thiosulfates, sulfites, bisulfites, reducing sugars such as glucose, sorbose, ascorbic acid, erythorbic acid, and the like. In general, the reducing agents are used at levels from 0.01 pphm to 5 pphm. Many of such initiators are known to those skilled in the art. Mixtures of initiators can be employed.

For the various embodiments, a surfactant can be used during the preparation of the polymeric binder and/or in the frothable aqueous composition. Examples of such surfactants include those generally used in emulsion polymerization processes. The surfactant can be anionic, nonionic, or mixtures thereof. The terms "surfactant," "emulsifying agent" and "emulsifier" are used interchangeably herein.

Suitable nonionic emulsifiers include polyoxyethylene condensates. Exemplary polyoxyethylene condensates that can be used include polyoxyethylene aliphatic ethers, such as polyoxyethylene lauryl ether and polyoxyethylene oleyl ether; polyoxyethylene alkaryl ethers, such as polyoxyethylene nonylphenol ether and polyoxyethylene octylphenol ether; polyoxyethylene esters of higher fatty acids, such as polyoxyethylene laurate and polyoxyethylene oleate, as well as condensates of ethylene oxide with resin acids and tall oil acids; polyoxyethylene amide and amine condensates such as N-polyoxyethylene lauramide, and N-lauryl-N-polyoxyethylene amine and the like; and polyoxyethylene thio-ethers such as polyoxyethylene n-dodecyl thio-ether.

Nonionic emulsifying agents that can be used also include a series of surface active agents available from BASF under the PLURONIC and TETRONIC trade names. In addition, a series of ethylene oxide adducts of acetylenic glycols, sold commercially by Air Products under the SURFYNOL trade name, are suitable as nonionic emulsifiers.

Suitable anionic emulsifiers include the alkyl aryl sulfonates, alkali metal alkyl sulfates, the sulfonated alkyl esters, and fatty acid soaps. Specific examples include sodium dodecylbenzene sulfonate, sodium butylnaphthalene sulfonate, sodium lauryl sulfate, disodium dodecyl diphenyl ether disulfonate, N-octadecyl sulfosuccinate and dioctyl sodiumsulfosuccinate. When used during the preparation of the polymeric binder the emulsifiers are employed in amounts effective to achieve adequate emulsification of the polymer in the aqueous phase and to provide desired particle size and particle size distribution.

Other ingredients known in the art to be useful for various specific purposes in emulsion polymerization, such as, acids, salts, chain transfer agents, chelating agents, buffering agents, neutralizing agents, defoamers and plasticizers also may be employed in the preparation of the polymeric binder. For example, if the polymerizable constituents include a monoethylenically unsaturated carboxylic acid monomer, polymerization under acidic conditions (pH 2 to below pH 7, preferably pH 2 to pH 5) is preferred. In such instances, the aqueous medium can include those known weak acids and their salts that are commonly used to provide a buffered system at the desired pH range.

Various protective colloids may also be used in place of or in addition to the emulsifiers described above. Suitable colloids include casein, hydroxyethyl starch, carboxyxethyl cellulose, carboxymethyl cellulose, hydroxyethylcellulose, gum arabic, alginate, poly(vinyl alcohol), polyacrylates, polymethacrylates, styrene-maleic anhydride copolymers, polyvinylpyrrolidones, polyacrylamides, polyethers, and the like, as known in the art of emulsion polymerization technology. In general, when used, these colloids are used at levels of 0.05% to 10% by weight based on the total weight of the emulsion polymerization reactor contents.

The manner of combining the polymerization ingredients for the preparation of the polymeric binder can be by various known monomer feed methods, such as, continuous monomer addition, incremental monomer addition, or addition in a single charge of the entire amounts of monomers. The entire amount of the aqueous medium with polymerization additives can be present in the polymerization vessel before introduction of the monomers, or alternatively, the aqueous medium, or a portion of it, can be added continuously or incrementally during the course of the polymerization.

Following polymerization, the solids content of the resulting aqueous dispersion of the polymeric binder can be adjusted to the level desired by the addition of water or by the removal of water by distillation. Generally, the desired level of polymeric binder solids content is from 40 weight percent to 75 weight percent based on the total weight of the polymeric binder, more preferably from 50 weight percent to 70 weight percent based on the total weight of the polymeric binder.

When used as a carpet backing composition the frothable aqueous composition can further include an inorganic filler, among other additives. Suitable inorganic fillers for use in carpet backing compositions are known and are commercially available. Examples of such inorganic fillers or pigments can include calcium carbonate, coal fly ash, ground glass, clay, kaolin, talc, barites, feldspar, titanium dioxide, calcium aluminum pigments, satin white, synthetic polymer pigment, zinc oxide, barium sulphate, gypsum, silica, alumina trihydrate, mica, hollow polymer pigments, and diatomaceous earth. Mixtures of inorganic fillers can be employed.

The amount of inorganic filler that can be employed in the preparation of the carpet backing composition can vary depending upon the density of the inorganic filler and the desired coating properties. The amount of the inorganic filler employed in the carpet backing composition of the present disclosure advantageously is up to 1000 dry weight parts per 100 dry weight parts of polymeric binder, preferably from 150 to 650 dry weight parts per 100 dry weight parts of polymeric binder, and more preferably 200 to 600 dry weight parts per 100 dry weight parts of polymeric binders.

For the various embodiments, the froth aid of the present disclosure includes a polypropylene glycol, a polypropylene glycol ether, or a combination thereof, where the combination can include one or more of a polypropylene glycol with one or more of a polypropylene glycol ether. In other words, while it is possible that either of the polypropylene glycol or polypropylene glycol ether can be used alone as a single homogeneous compound, combinations of one or more of the polypropylene glycols and/or the polypropylene glycol ethers from a homologous series of the compounds can be used where the weight average molecular weight of the combination is as provided herein. So, for the various embodiments the froth aid of the frothable aqueous composition has a weight average molecular weight of 130 to 2000, and preferably having a weight average molecular weight of 190 to 1200.

For the various embodiments, the polypropylene glycol ether has a formula R—O—[$CH_2CH(CH_3)$]$_n$—OH, where R is hydrogen or an alkyl group containing 1 to 22 carbon atoms ($C_1$-$C_{22}$) and n is a number from 2 to 35. Other preferred ranges for n include a number from 3 to 20. Preferred polypropylene glycol ethers are where R is an alkyl group containing 1 to 8 carbon atoms ($C_1$-$C_8$), and most preferred are glycol ethers where R is an alkyl group containing 1 to 4 carbon atoms ($C_1$-$C_4$). For the various embodiments, when R is an alkyl group, the alkyl group can be straight chain and/or branched (contain secondary and/or teriary alkyl groups).

Frothability and froth stability of the frothable aqueous composition can be affected by the weight average molecular weight of the polypropylene glycols and/or the polypropylene glycol ethers, and/or the lengths of the alkyl groups of the glycol ethers. For example, polypropylene glycols and/or polypropylene glycol ethers at the lower end of the weight average molecular weight range given herein tend to froth more quickly as compared to those at the higher end of the weight average molecular weight range, but they also tend to produce a more stable froth. In contrast, those polypropylene glycols and/or polypropylene glycol ethers at the higher end of the weight average molecular weight range given herein tend to resist frothing, but they also tend to produce a less stable froth as compared to the lower end of the weight average molecular weight range given herein.

Therefore, the amount, the weight average molecular weights, the mixture, and/or the ratio of the polypropylene glycol and/or polypropylene glycol ether for the froth aid used may be tailored dependent upon the intended application to achieve the desired froth density and froth stability from the frothable aqueous composition. For instance, when the frothable aqueous composition is used as a carpet backing composition it would be desirable to have greater frothability to facilitate more complete froth coverage with coat weight control. It would also be desirable for the froth to have a diminished stability such that the froth collapses after application and before drying is complete in order to obtain good adhesion to a secondary backing and decrease the setting of voids by the dried compound. A froth having such diminished stability may be considered collapsible.

Based at least partly on this understanding, using the froth aid of the present disclosure it would be possible then to produce a froth from the frothable aqueous composition having the desired characteristics of increased volume with decreased stability through the selection and use of the froth aid of the present disclosure. For example, one of the polypropylene glycol and the polypropylene glycol ether of the froth aid can be selected to decrease a stability of the froth of the frothable aqueous composition, while another of the polypropylene glycol and the polypropylene glycol ether of the froth aid can be selected to increase the volume of the froth of the frothable aqueous composition. In an additional embodiment, selection of the froth aid may also be made to cause the froth of the mixture to both increase in volume and to collapse in a predetermined time interval. In one embodiment, the predetermined time interval is from 2 to 5 minutes. As appreciated, the time interval will vary with the application and application conditions (for example shear and temperature) such that other predetermined time intervals dependent on the intended application are also possible.

In an additional embodiment, one or more of the polypropylene glycol and/or polypropylene glycol ether of the froth aid can also be used with a surfactant, as discussed herein, that is added to the frothable aqueous composition, where the combination of the froth aid and the surfactant can be tailored to provide the similar benefits of rapid initial froth density and subsequent instability of the frothable aqueous composition. For example, the froth aid of the present disclosure can be used with a surfactant such as sodium lauryl sulfate, among others.

For the various embodiments, the froth of the frothable aqueous composition can have an air content of 5% to 95% air by volume and preferably an air content of 30% to 80% air by volume. The extent of frothing is commonly expressed as percent air entrapment or froth density. For example, 50 percent air entrapment corresponds to an amount of air such that if a specified volume of unfrothed composition weighs 200 grams, then the same volume of frothed composition would weigh 100 grams. Alternatively, the froth density can be determined by determining the mass of a specified volume of a froth of the frothable aqueous composition.

For the various embodiments, the amount of the froth aid employed in the frothable aqueous composition can be 0.05 to 3.0 weight parts, on a dry basis, per 100 dry weight parts of the polymeric binder. Preferably, the amount of the froth aid employed in the frothable aqueous composition can be 0.1 to 1.5 weight parts, on a dry basis, per 100 dry weight parts of the polymeric binder.

Carpet backing compositions of the present disclosure may have various percent (%) by weight concentrations of the polymeric binder and the inorganic filler. For example, a carpet backing composition may have 11% to 100% by weight of the polymeric binder and up to 89% by weight of the inorganic filler, based on the total weight of binder and filler. Preferably, the carpet backing compositions contain 14% to 50% by weight of the polymeric binder and 50% to 86% by weight of inorganic filler based on the total weight of binder and filler.

Generally, the disclosed frothable aqueous compositions can be frothed in a temperature range of 4° C. to 57° C., and more preferably in a temperature range of 18° C. to 41° C. For the various embodiments, pre-conditioning of the frothable aqueous composition can also take place. Such pre-conditioning steps can include, but are not limited to, a cooling of the frothable aqueous composition to a predetermined temperature prior to frothing.

For the various embodiments, the carpet backing composition of the present disclosure can further include conventional additives. Examples of these conventional additives include, but are not limited to, thickeners, catalysts, dispersants, chelating agents, colorants, biocides, and the like. Examples of such conventional additives are listed in "2002 McCutcheon's Volume 2: Functional Materials," McCutcheon's Division, MC Publishing Co., 175 Rock Road, Glen Rock, N.J. 07452 USA. Common surfactants are listed in "2002 McCutcheon's Volume 1: Emulsifiers and Detergents."

A carpet backing composition of the present disclosure advantageously can be used in producing a carpet product. The carpet backing composition may also be employed in the manufacture of carpet according to known techniques. For example, the carpet backing composition can be formed, as discussed herein, by mixing the polymeric binder with the inorganic filler and the froth aid, among other components. Gas is incorporated into the carpet backing composition to form a froth. The froth of the carpet backing composition is then applied to the yarn on the backing of the carpet at a desired coat weight to embed the yarn of the backing in the carpet backing composition. The froth of the carpet backing composition also has sufficient built-in instability (e.g., through the selection of the froth aid) such that the froth collapses after application and before drying is complete. Such collapse is necessary to obtain good binding to the backing of the carpet.

The carpet backing composition of the present disclosure can be used in the production of conventional tufted carpet, non-tufted carpet, needle-punched, and woven carpet and can be dried using equipment that is known to those skilled in the art, such as that used in carpet mills. Thus, the carpet backing composition may be useful in the production of pile carpets having a primary backing with pile yarns extending from the primary backing to form pile tufts; as well as non-tufted carpets wherein the fibers are embedded into the binder composition that has been coated onto a woven or non-woven substrate.

In preparing a tufted carpet, the yarn is tufted or needled into a primary backing, which is generally non-woven polypropylene, polyethylene or polyester or woven jute or polypropylene. If a secondary backing is used, it is generally formed of woven or non-woven materials similar to those used as the primary backing. Such a secondary backing provides dimensional stability to the carpet. The secondary backing can be in the form of a foam polymer or copolymer. Suitable foam compositions include urethane polymers, polymers and copolymers of ethylene, propylene, isobutylene and vinyl chloride.

When a foam secondary backing is used, it can be pre-foamed and then laminated onto the primary backing, or it can contain a thermally activatable blowing agent and can be frothed immediately prior to lamination or after lamination. Additionally, the secondary backing can exhibit thermoplastic adhesive properties of its own, and the secondary backing can be preheated prior to lamination to render the surface thereof adhesive. Alternatively, the secondary backing can be a hot melt, one or more or fused PVC plastisol layer(s) or bitumen, often in conjunction with fiberglass scrim or other scrim known to provide dimensional stability.

It is also contemplated that the carpet backing composition disclosed herein can be used as the pre-coat binder and as the secondary backing binder. The pre-coat layer can optionally be dried before the secondary backing binder is applied. The secondary backing binder can be applied either to the pre-coated griege or to the secondary backing.

For the various embodiments, the carpet backing composition is generally thickened to a viscosity of 4000 cP to 30000 cP (measured at room temperature with a Brookfield RVT viscometer, spindle #5 or #6 at 20 rpm). Generally, higher viscosities increase both frothability and stability.

The carpet backing composition of the disclosure is easier to apply to the carpet product than hot melt thermoplastic adhesives that require expensive and complex machines and processes to apply a coating, and the carpet backing composition also penetrates the fibers of the carpet yarns to yield better adhesion, fiber bundle integrity and anti-fuzzing properties. The term "tuft-bind" refers to the ability of the carpet backing composition to lock and secure the pile yarn tufts to the primary backing and is determined as set forth herein. Tuft-bind is also used to include the superior characteristics needed in non-tufted coatings wherein the adhesion of the fiber pile is achieved solely by the backing. Suitable tuft-bind properties can be achieved by applying an amount of the carpet backing composition ranging from 10 ounces per square yard to 40 ounces per square yard (dry basis) to the carpet product, which results in a carpet having a tuft-bind value of at least 6 pounds force for loop carpet (3 pounds for cut pile), and in many instances a tuft-bind value of 15 pounds force or greater.

The present disclosure also provides a method of preparing a pile or tufted carpet that may include tufting or needling the yarn into a woven or non-woven backing; applying the frothed carpet backing composition of the present disclosure to the rear of the carpet backing such that the yarn is embedded in the carpet backing composition; and drying the carpet backing composition applied to the carpet backing.

In producing such tufted carpets it is also desirable to apply a secondary backing to the primary backing either before or after drying of the carpet pre-coat, depending upon the type of backing employed. It is also possible to employ an additional frothed or unfrothed coating to the carpet griege or secondary backing during carpet manufacture.

Non-tufted carpets also can be prepared utilizing the carpet backing compositions of the disclosure by a method that can include coating a carpet backing composition of the present disclosure onto a substrate; embedding the carpet fibers in the substrate; and drying the resultant carpet construction.

These non-tufted carpets also can be advantageously prepared utilizing a secondary backing to provide additional dimensional stability.

Carpet products prepared using the frothable aqueous composition of this disclosure advantageously is substantially free of a porous structure in the coating.

Examples

The following examples are given to illustrate, but not limit, the scope of this disclosure. Unless otherwise indicated, all parts and percentages (%) are by weight. Unless otherwise specified, all instruments and chemicals used are commercially available.

Materials

Polymeric Binder A: Carboxylated styrene-butadiene latex (XZ 92229.00 Latex, The Dow Chemical Company), 52 percent (%) solids in water.

Filler A: dry calcium carbonate (MW101 from O-N Minerals, Filler Products Operation, Chatworth, Ga., USA).

Thickener A: sodium polyacrylate thickener (PARAGUM 265 from Para-Chem Standard Division, Dalton, Ga.).

Froth Aid A: Polypropylene glycol monoallyl ether: (UCON Lubricant APPG-200, MW 200, R=Allyl, The Dow Chemical Company).

Froth Aid B: Polypropylene glycol monoallyl ether: (UCON Lubricant APPG-800R, MW 800, R=Allyl, The Dow Chemical Company).

Froth Aid C: Polypropylene glycol: (POLYGLYCOL P425, MW 425, The Dow Chemical Company).

Froth Aid D: Polypropylene glycol: (POLYGLYCOL P1200, MW 1200, The Dow Chemical Company).

Froth Aid E: Polypropylene glycol: (POLYGLYCOL P2000, MW 2000, The Dow Chemical Company).

Froth Aid F: Polypropylene glycol: (POLYGLYCOL P4000, MW 4000, The Dow Chemical Company).

Froth Aid G: Tripropylene glycol-monomethyl ether (DOWANOL TPM, MW 206, R=Methyl, The Dow Chemical Company).

Froth Aid H: Tripropylene glycol-monobutyl ether (DOWANOL TPnB, MW 248, R=n-Butyl, The Dow Chemical Company).

Froth Aid I: Polypropylene glycol-monobutyl ether (UCON Lubricant LB-65, MW 340, R=n-Butyl, The Dow Chemical Company).

Froth Aid J: Polypropylene glycol monomethyl ether (DOWFROTH 250, MW 250, R=Methyl, The Dow Chemical Company).

Froth Aid K: Polypropylene glycol monomethyl ether (DOWFROTH 250A (PM Heavies), R=Methyl, The Dow Chemical Company).

Froth Aid L: Polypropylene glycol monopropyl ether (MW 280, R=n-Propyl, The Dow Chemical Company).

Froth Aid M: Polyproylene glycol monobutyl ether (MW 295, R=n-Butyl, The Dow Chemical Company).

Froth Aid N: Propylene Glycol (MW 76, The Dow Chemical Company).

Froth Aid O: Dipropylene Glycol (MW 134, The Dow Chemical Company).

Froth Aid P: Tripropylene Glycol (MW 192, The Dow Chemical Company).

Froth Aid Q: Propylene Glycol Monomethyl Ether (DOWANOL PM Glycol Ether, MW 90, R=Methyl, The Dow Chemical Company).

Froth Aid R: Dipropylene Glycol Monomethyl Ether (DOWANOL DPM Glycol Ether, MW 148, R=Methyl, The Dow Chemical Company).

Froth Aid S: Propylene Glycol n-Butyl Ether (DOWANOL PnB Glycol Ether, MW 132, R=n-Butyl, The Dow Chemical Company).

Froth Aid T: Dipropylene Glycol n-Butyl Ether (DOWANOL DPnB Glycol Ether, MW 190, R=n-Butyl, The Dow Chemical Company).

Surfactant A: Sodium Lauryl Sulfate: (Calimulse SLS available from Pilot Chemical Company, Santa Fe Springs, Calif.), 30% active.

Test Methods

The following test procedures evaluate the frothability and froth stability for aqueous dispersions of the Polymeric Binder A and the frothable aqueous compositions of the present disclosure. The frothable aqueous compositions include, but are not limited to, the Polymeric Binder A and at least one of the Froth Aid, where the amount of the Froth Aid(s) of the frothable aqueous composition is in weight parts, on a dry basis, per 100 dry weight parts of the polymeric binder. The test results are illustrative and are not to be construed as limiting.

The extent of frothability is expressed as froth density. Determine the froth density by transferring 100 cc of frothed material into beaker, determine the mass in grams (g) of the frothed material in the beaker, and multiply the mass of the frothed material by 10 to arrive at the froth density in grams/liter.

Frothability and Froth Stability

Froth a 200 gram sample of the aqueous dispersion of the Polymeric Binder A or of the frothable aqueous composition, according to the present disclosure, in a Hobart N50 Model D industrial mixer (Hobart, Troy Ohio). The Hobart N50 mixer has a modified wire-loop whisk (the five shortest wires removed) and a 5-liter stainless steel mixing bowl. Measure the froth density of the frothed material at 1 minute and 6 minutes to obtain a measure of how fast the frothed material is being generated and the percent air entrapment.

In order to test froth stability at an equivalent froth density, froth another 200 gram sample of aqueous dispersions of the Polymeric Binder A or of the frothable aqueous composition to a density of 155 grams/liter. Measure the volume of the frothed material. Measure the percent stability of the frothed material at 30 minutes by dividing the froth volume at 30 minutes by the starting froth volume and multiplying by 100. A lower percent volume of froth remaining indicates lower froth stability.

To determine the effect of different Froth Aids and/or surfactants, add the Froth Aids and/or the surfactants to the Polymeric Binder A before frothing in the Hobart N50 mixer. Measure the amount of Froth Aid and/or surfactant added in weight parts, on a dry basis, per 100 dry weight parts of the polymeric binder. For example to calculate the mass in grams of a froth aid needed to obtain 0.5 part of a 30 percent solids froth aid in a 50 percent solids polymeric binder, divide the parts of froth aid desired by the percent froth aid solids, then multiply the result by the percent polymeric binder solids and then multiply the result by the grams of polymeric binder, then divide by 100 (in this case 0.5 parts froth aid would be 1.66 grams of 30 percent froth aid in 200 grams of 50 percent solids polymeric binder).

The samples in Tables 1-7, below, are frothed at room temperature and at a speed setting of 3 for the Hobart N50 mixer, except for those results having an asterisk, which indicates that the sample was frothed at room temperature and a speed setting of 2 for the Hobart N50 mixer.

TABLE 1

Effectiveness of Froth Aid (0.25 parts) on Frothability and Froth Stability

Polymeric Binder A, 0.25 Parts Additive

| Additive | Approx. MW | Foam Density (1 min), g/L | Foam Density (6 min), g/L | Time (min.) to 155 g/L Density | Percent (%) Stability |
|---|---|---|---|---|---|
| None |  | 245 | 145 | 6 | 95 |
| Surfactant A |  | 197 | 110 | 2 | 95 |
| Froth Aid C | 425 | 121 | 79 | 6.25* | 100 |
| Froth Aid K | 250 | 77 | 60 | 2* | 20 |
| Froth Aid A | 200 | 95 | 75 | 5* | 95 |
| Froth Aid L | 280 | 89 | 76 | 6* | 60 |
| Froth Aid M | 295 | 159 | 77 | 1 | 80 |

The data of Table 1 demonstrates that Froth Aids of the present disclosure are effective in both producing frothability and advantageously imparting instability into the froth that is generated. In addition, the Froth Aids in Table 1 provide a dispersion that froths more readily than a standard surfactant, sodium lauryl sulfate (Surfactant A). The froth stability of the froth can also be advantageously varied depending upon the composition of the Froth Aid of the present disclosure.

TABLE 2

Effectiveness of Froth Aid (0.5 parts) on Frothability and Froth Stability

Polymeric Binder A, 0.5 Parts Additive

| Additive | Approx. MW | Foam Density (1 min), g/L | Foam Density (6 min), g/L | Time (min.) to 155 g/L Density | Percent (%) Stability |
|---|---|---|---|---|---|
| None |  | 245 | 145 | 6 | 95 |
| Surfactant A |  | 166 | 95 | 1 | 99 |
| Froth Aid C | 425 | 62 | 59 | 4.5* | 95 |
| Froth Aid K | 250 | 64 | 54 | 1.5* | 20 |
| Froth Aid A | 200 | 73 | 62 | 4.5* | 95 |
| Froth Aid L | 280 | 66 | 51 | 4.2* | 85 |
| Froth Aid M | 295 | 118 | 69 | 0.67 | 85 |

The data of Table 2 demonstrates that the same trends are obtained at a higher level of Froth Aid as compared to the data of Table 1.

TABLE 3

Effect of Froth Aid MW on Frothability and Froth Stability (0.25 Parts Additive)

Polymeric Binder A, 0.25 Parts Additive

| Additive | Approx. MW | Foam Density (1 min), g/L | Foam Density (6 min), g/L | Time (min.) to 155 g/L Density | Percent (%) Stability |
|---|---|---|---|---|---|
| None |  | 245 | 145 | 6 | 95 |
| Surfactant A |  | 197 | 110 | 2 | 95 |
| Froth Aid N | 76 | 230 | 130 | 3 | 85 |
| Froth Aid O | 134 | 189 | 105 | 2 | 70 |
| Froth Aid P | 192 | 65 | 58 | 5* | 95 |
| Froth Aid C | 425 | 121 | 79 | 6.25* | 100 |
| Froth Aid D | 1200 | 273 | 129 | 6.5 | 90 |
| Froth Aid E | 2000 | 975 | 175 | 12 | 100 |
| Froth Aid F | 4000 | 723 | 432 | n.a. | 100 |
| Froth Aid Q | 90 | 205 | 105 | 2 | 90 |
| Froth Aid R | 148 | 130 | 85 | 5* | 90 |
| Froth Aid G | 206 | 121 | 80 | 5.3* | 95 |
| Froth Aid K | 250 | 77 | 60 | 2* | 20 |
| Froth Aid A | 200 | 95 | 75 | 5* | 95 |
| Froth Aid B | 800 | 327 | 127 | 3.8 | 55 |
| Froth Aid S | 132 | 95 | 65 | 4.5* | 90 |
| Froth Aid T | 190 | 99 | 67 | 5* | 90 |
| Froth Aid H | 248 | 127 | 82 | 5.8* | 98 |

TABLE 3-continued

Effect of Froth Aid MW on Frothability and Froth Stability (0.25 Parts Additive)

Polymeric Binder A, 0.25 Parts Additive

| Additive | Approx. MW | Foam Density (1 min), g/L | Foam Density (6 min), g/L | Time (min.) to 155 g/L Density | Percent (%) Stability |
|---|---|---|---|---|---|
| Froth Aid M | 295 | 159 | 77 | 1 | 80 |
| Froth Aid I | 340 | 279 | 113 | 4 | 85 |

(n.a.—not achieved).

The data of Table 3 demonstrates the effect of the weight average molecular weight (MW) of the Froth Aids on the frothability and froth stability of aqueous dispersions of the Polymeric Binder A and the frothable aqueous compositions of the present disclosure. As Table 3 illustrates, there is a decrease in frothability at higher MWs of the Froth Aids, which may be due to a reduction in solubility of the Froth Aid in water as its MW is increased. That Froth Aid C is a better Froth Aid than Froth Aid J could be explained by the greater solubility of the polyglycols than the polyglycol butyl ethers at a given MW. The froth stability can also be varied by varying the MW and the R group of the polypropylene glycol ether. Table 3 provides results indicating that a preferred MW for improving frothability is in a range of 190 to 300. For example, Froth Aid P (MW=192) provides excellent frothability with a froth that is relatively stable (comparable to the control of Surfactant A), while Froth Aid K (MW=250) provides excellent frothability with a very unstable froth.

TABLE 4

Effect Froth Aid MW on Frothability and Froth Stability (0.5 Parts Additive)

Polymeric Binder A, 0.5 Parts Additive

| Additive | Approx. MW | Foam Density (1 min), g/L | Foam Density (6 min), g/L | Time (min.) to 155 g/L Density | Percent (%) Stability |
|---|---|---|---|---|---|
| None | | 245 | 145 | 6 | 95 |
| Surfactant A | | 166 | 95 | 1 | 99 |
| Froth Aid N | 76 | 225 | 125 | 3 | 90 |
| Froth Aid O | 134 | 170 | 92 | 1 | 75 |
| Froth Aid P | 192 | 56 | 51 | 5* | 85 |
| Froth Aid C | 425 | 62 | 59 | 4.5* | 95 |
| Froth Aid D | 1200 | 240 | 102 | 2.25 | 90 |
| Froth Aid E | 2000 | 1025 | 185 | 8 | 100 |
| Froth Aid F | 4000 | 809 | 545 | n.a. | n.a. |
| Froth Aid Q | 90 | 178 | 88 | 1 | 90 |
| Froth Aid R | 148 | 130 | 80 | 4.5* | 85 |
| Froth Aid G | 206 | 114 | 75 | 4.8* | 95 |
| Froth Aid K | 250 | 64 | 54 | 1.5* | 20 |
| Froth Aid A | 200 | 73 | 62 | 4.5* | 95 |
| Froth Aid B | 800 | 436 | 120 | 2.5 | 40 |
| Froth Aid S | 132 | 57 | 49 | 3* | 90 |
| Froth Aid T | 190 | 65 | 52 | 3.5* | 100 |
| Froth Aid H | 248 | 115 | 78 | 5.3* | 100 |
| Froth Aid M | 295 | 140 | 74 | 0.75 | 80 |
| Froth Aid I | 340 | 344 | 99 | 2 | 55 |

(n.a.—not achieved).

Table 4 presents data demonstrating that the same trends are obtained at a higher level of Froth Aid as compared to the data of Table 3.

TABLE 5

Effect of Froth Aid Parts Additive Level on Frothability and Froth Stability

Polymeric Binder A

| Additive | Approx. MW | Parts Additive Level | Foam Density (1 min), g/L | Foam Density (6 min), g/L | Time to 155 g/L Density | Percent (%) Stability |
|---|---|---|---|---|---|---|
| None | | | 245 | 145 | 6 | 95 |
| Surfactant A | | 0.25 | 197 | 110 | 2 | 95 |
| | | 0.5 | 166 | 95 | 1 | 99 |
| Froth Aid A | 200 | 0.1 | 169 | 115 | 0.6 | 90 |
| | | 0.2 | 129 | 90 | 0.3 | 90 |
| | | 0.25 | 95 | 75 | 5* | 95 |

TABLE 5-continued

Effect of Froth Aid Parts Additive Level on Frothability and Froth Stability

| | | Parts | Polymeric Binder A | | | |
|---|---|---|---|---|---|---|
| Additive | Approx. MW | Additive Level | Foam Density (1 min), g/L | Foam Density (6 min), g/L | Time to 155 g/L Density | Percent (%) Stability |
| | | 0.4 | 80 | 60 | 5.5* | 95 |
| | | 0.5 | 73 | 62 | 4* | 95 |
| | | 1 | 55 | 48 | 2* | 95 |
| | | 2 | 51 | 48 | 1.5* | 95 |
| | | 3 | 48 | 47 | 1.5* | 90 |
| Froth Aid B | 800 | 0.1 | 536 | 147 | 9.5 | 90 |
| | | 0.25 | 327 | 127 | 3.8 | 55 |
| | | 0.5 | 436 | 120 | 2.7 | 45 |
| Froth Aid K | 250 | 0.0312 | 161 | 99 | 1 | 55 |
| | | 0.0625 | 128 | 99 | 1.1 | 45 |
| | | 0.125 | 113 | 85 | 5* | 20 |
| | | 0.25 | 88 | 82 | 2* | 20 |
| | | 0.5 | 66 | 59 | 1.5* | 20 |
| | | 1 | 55 | 47 | 1.5* | 20 |
| | | 2 | 54 | 47 | 1.5* | 20 |
| | | 3 | 65 | 47 | 1.5* | 20 |

The data of Table 5 demonstrate the effect of the weight parts of the Froth Aid on the frothability and froth stability of aqueous dispersions of the Polymeric Binder A and the frothable aqueous compositions of the present disclosure. Table 5 illustrates that the frothability generally increases with the addition of more Froth Aid. The effect on froth stability, however, varies with the composition of the Froth Aid. The froth stability remains essentially constant with increasing Froth Aid for Froth Aid A. However, the froth stability decreases with increasing Froth Aid for Froth Aids B and K.

TABLE 6

Effect of Combinations of Froth Aids on Foamability and Froth Stability

| Froth Aid A | Froth Aid B | Polymeric Binder A | | | |
|---|---|---|---|---|---|
| Weight Parts | Weight Parts | Foam Density (1 min), g/L | Foam Density (6 min), g/L | Time (min.) to 155 g/L density | Percent (%) Stability |
| 0 | 0 | 245 | 145 | 6 | 95 |
| 0.25 | 0 | 95 | 75 | 5 (set 2) | 95 |
| 0.125 | 0.125 | 561 | 106 | 2.5 | 70 |
| 0 | 0.25 | 327 | 127 | 3.8 | 55 |
| 0.5 | 0 | 73 | 62 | 4 (set 2) | 95 |
| 0.125 | 0.375 | 303 | 87 | 2.25 | 65 |
| 0.25 | 0.25 | 233 | 65 | 1.75 | 60 |
| 0.375 | 0.125 | 266 | 81 | 1 | 55 |
| 0 | 0.5 | 436 | 120 | 2.5 | 40 |

Table 6 presents data demonstrating the effect of combinations of the Froth Aids of the present disclosure. The data of Table 6 demonstrate that various combinations of the Froth Aids may be used to obtain an intermediate level of frothability and froth stability, allowing for a desired frothability with the desired level of instability to be achieved. For example, the addition of 0.25 parts of Froth Aid A and 0.25 parts of Froth Aid B allows one to increase the frothability of the Polymeric Binder A while at the same time decreasing the froth stability.

TABLE 7

Blends of Froth Aid K and Surfactant A (Surf. A)

Polymeric Binder A

| Froth Aid K | Surf. A | Foam Density (1 min), g/L | Foam Density (6 min), g/L | Time (min.) to 155 g/L Density | Percent (%) Stability |
|---|---|---|---|---|---|
| 0 | 0 | 245 | 145 | 6 | 95 |
| 0.125 | 0 | 113 | 85 | 5 (set 2) | 20 |
| 0.0625 | 0.0625 | 109 | 87 | 0.5 | 70 |
| 0 | 0.125 | 220 | 120 | 3.5 | 95 |
| 0.25 | 0 | 88 | 82 | 5 (set 2) | 20 |
| 0.125 | 0.125 | 95 | 83 | 0.25 | 45 |
| 0 | 0.25 | 197 | 110 | 2 | 95 |

The data of Table 7 demonstrates that combinations of Surfactant A (sodium lauryl sulfate) with the Froth Aids of the present disclosure can produce a dispersion that froths better than the use of Surfactant A alone while still allowing for varying levels of froth instability.

Carpet Coating Composition Frothability and Froth Stability

Table 8 provides a formulation for preparing a carpet coating composition according to the present disclosure. To prepare the coating composition, add the Polymeric Binder A and sufficient water to provide 80 weight percent final compound solids to a mixing container. Add Filler A and Additive (Surfactant A or a Froth Aid) separately with 1 minute of mixing after each addition. Add the Thickener A and stir the resulting carpet coating composition slowly for 5 minutes at a rate that is insufficient to cause entrainment of air. Determine the viscosity of the carpet coating composition at room temperature with a Brookfield RVT Viscometer using spindle #5 at 20 rpm.

Froth a 600 gram sample of the carpet coating composition in the Hobart N50 industrial mixer as previously described. Measure the froth density of the froth material, as previous discussed, at 1 minute, 6 minutes and 15 minutes to obtain a measure of how fast the frothed material is generated and the ultimate air content of the frothed material. The 15 minute froth is drawn down on a glass plate at room temperature with a 20 mil. (0.020 inch) gap casting bar. The stability of the froth is rated visually. Table 8 presents this data.

TABLE 8

Carpet Coating Composition Frothability and Froth Stability
Carpet Coating Compositions with the noted Additive

|  | Comparative Expt. A | Expt 1 | Expt 2 |
|---|---|---|---|
| Additive | Surfactant A | Froth Aid A | Froth Aid K |
| Additive Level, parts | 0.6 | 0.6 | 0.6 |
| Initial Density, g/L | 1650 | 1655 | 1690 |
| Froth Density (1 min), g/L | 1005 | 910 | 970 |
| Froth Density (6 min), g/L | 405 | 345 | 370 |
| Froth Density (15 min), g/L | 428 | 345 | 385 |
| Froth Stabiltiy | 1 | 3 | 5 |

| Formulation | parts Dry |
|---|---|
| Polymeric Binder A | 100 |
| Filler A | 400 |
| Thickener A | To 4000 cP (about 0.5 pts) |

Rating Scale (Visual Observation)
1 - Stable (no froth collapse in 1 minute)
2 - Slightly unstable
3 - Moderately Stable (about 50% forth collapse in 1 minute)
4 - Unstable
5 - Very unstable (near total collapse in 1 minute)

The data indicates that carpet coating compositions using Froth Aid A and K froth faster, to a greater air content (i.e. have lower density), and have lower stability than those that are made with Surfactant A (sodium lauryl sulfate).

What is claimed is:

1. A carpet product prepared with a carpet backing composition where the carpet backing composition is present over a primary backing of the carpet product, the carpet backing composition, comprising:
    a frothable aqueous composition having 11% to 100% by weight of a polymeric binder and up to 89% by weight of an inorganic filler, based on a total weight of the polymeric binder and the inorganic filler; and
    a froth aid comprising a polypropylene glycol, a polypropylene glycol ether, or a combination thereof, where the froth aid has a weight average molecular weight of 130 to 2000.

2. The carpet product of claim 1, where the amount of froth aid in the carpet backing composition is 0.05 to 3.0 weight parts, on a dry basis, per 100 dry weight parts of the polymeric binder.

3. The carpet product of claim 1, where the polymeric binder in the carpet backing composition has a binder solids content of 40 weight percent to 75 weight percent based on a total weight of the polymeric binder.

4. The carpet product of claim 1, where the polypropylene glycol ether in the froth aid has a formula R—O—[CH$_2$CH(CH$_3$)]$_n$—OH, where R is hydrogen or an alkyl group containing 1 to 22 carbon atoms.

5. The carpet product of claim 4, where R is an alkyl group containing 1 to 8 carbon atoms.

6. The carpet product of claim 1, where the polymeric binder has a Tg from −20° C. to 30° C.

7. A method of coating a carpet, comprising:
   frothing a frothable aqueous composition having a polymeric binder, an inorganic filler, and a froth aid, the froth aid comprising a polypropylene glycol, a polypropylene glycol ether, or a combination thereof to form a froth, where froth aid has a weight average molecular weight of 130 to 2000; and
   applying the froth to a primary backing of the carpet.

8. The method of claim 7, where the polypropylene glycol ether has a formula R—O—[CH$_2$CH(CH$_3$)]$_n$—OH where R is hydrogen or an alkyl group containing 1 to 22 carbon atoms (C$_1$-C$_{22}$) and n is a number from 2 to 35.

9. The method of claim 7, where frothing the frothable aqueous composition includes preparing a froth of the frothable aqueous composition having an air content of 5% to 95% air by volume.

10. The method of claim 7, including selecting the froth aid to cause the froth of the mixture to both increase in volume and to collapse from the increase in volume in a predetermined time interval of 2 minutes to 5 minutes.

* * * * *